F. L. JEFFERIES & W. SPAIN.
CAPPING MACHINE FOR CANS.
APPLICATION FILED FEB. 18, 1911.
1,015,320.
Patented Jan. 23, 1912.
5 SHEETS—SHEET 3.
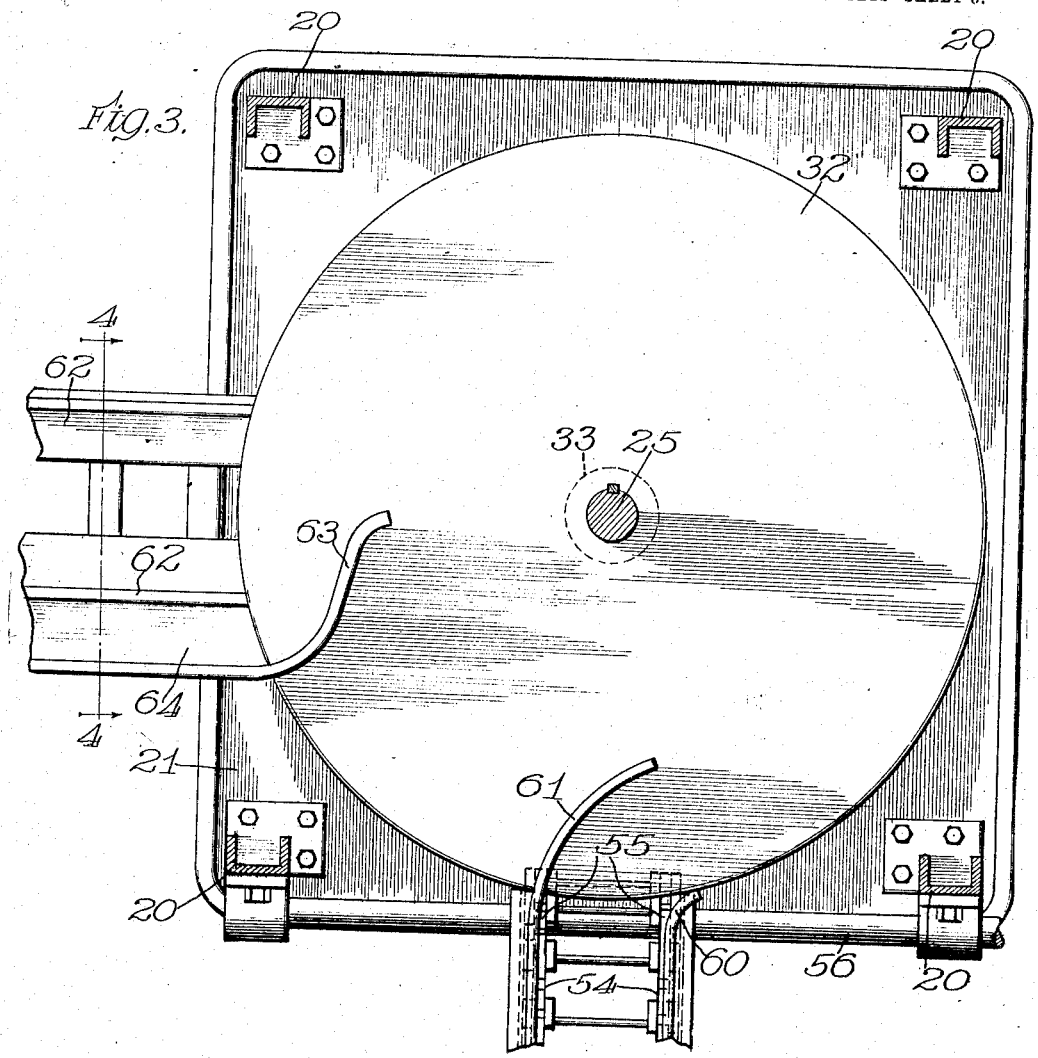
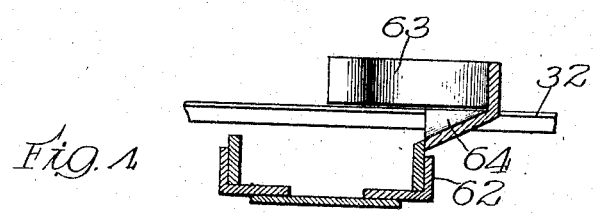

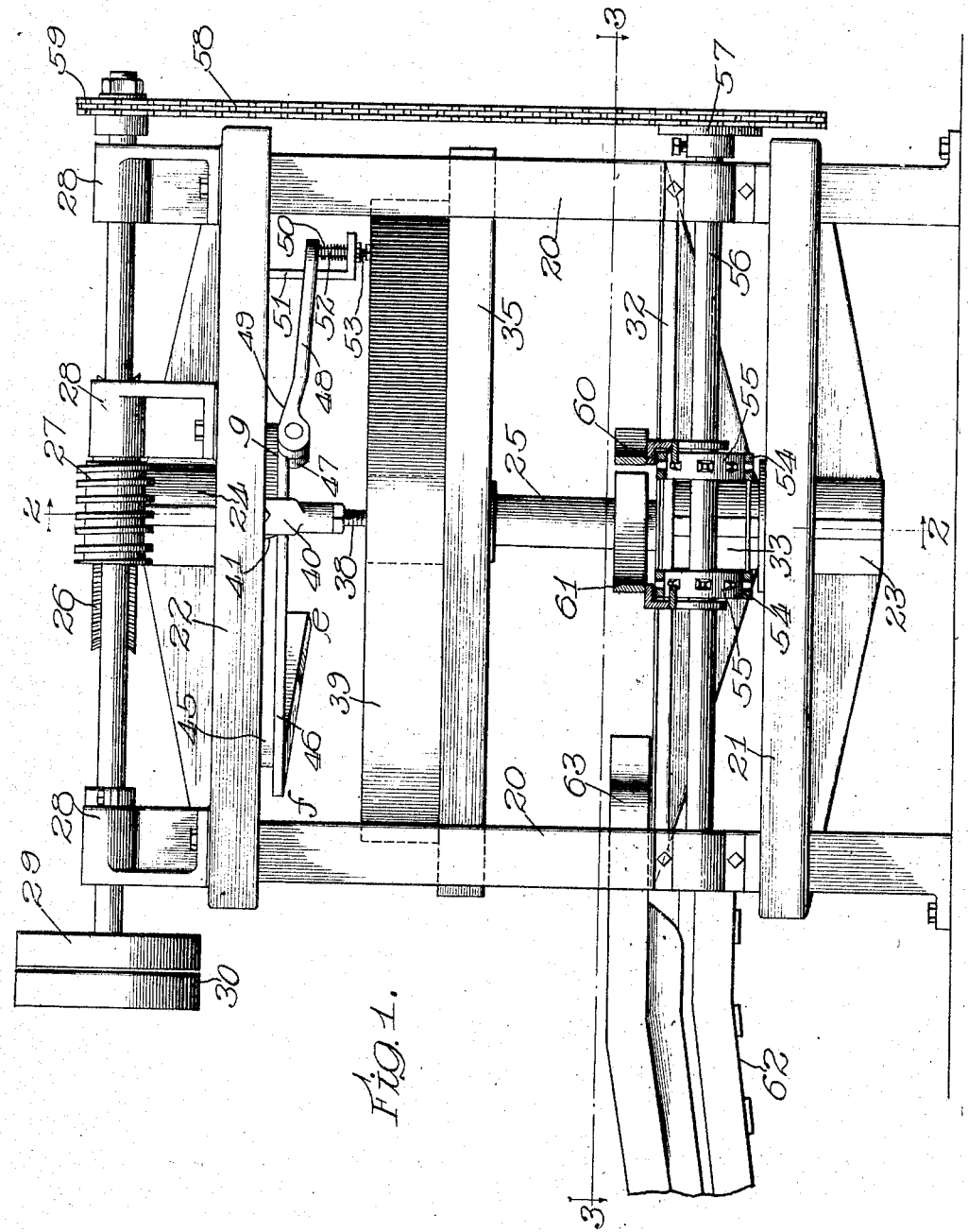

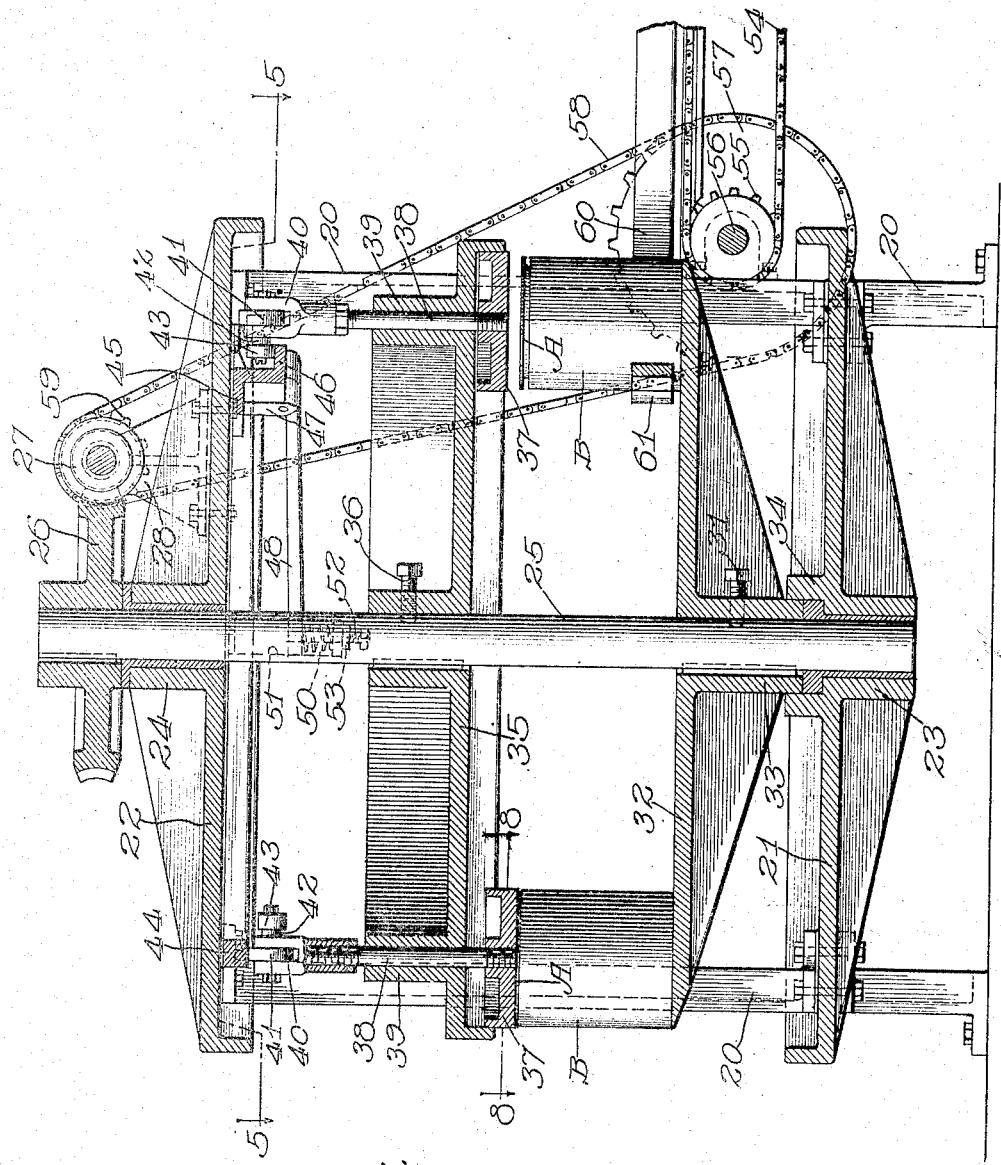

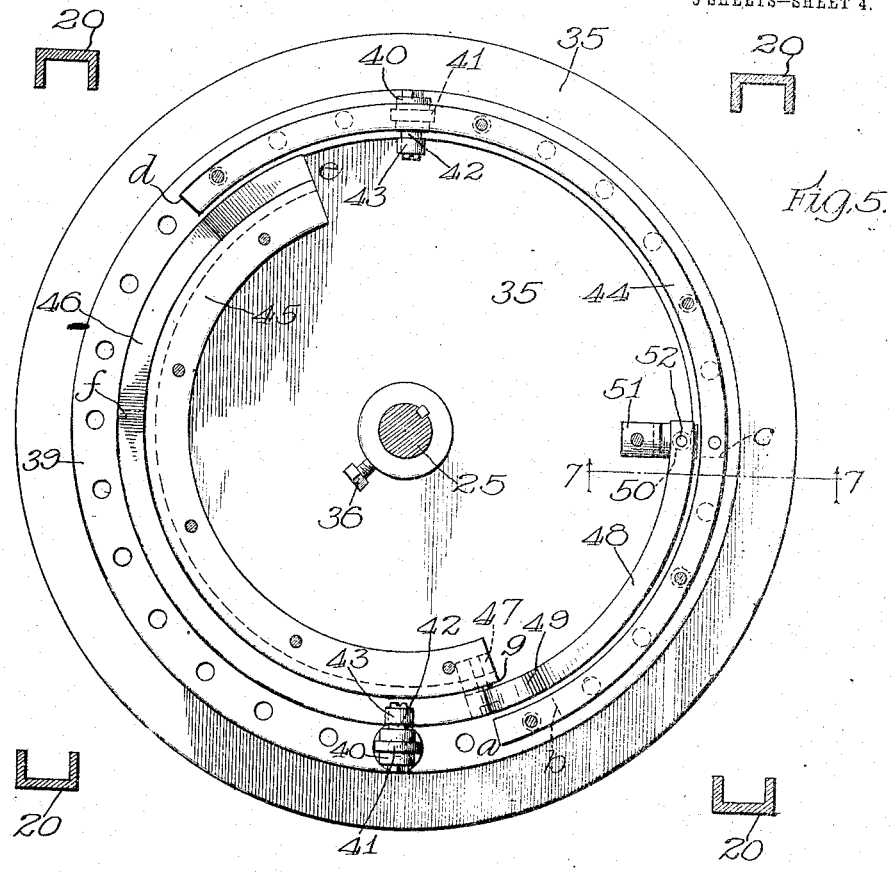

F. L. JEFFERIES & W. SPAIN.
CAPPING MACHINE FOR CANS.
APPLICATION FILED FEB. 18, 1911.
1,015,320.
Patented Jan. 23, 1912.
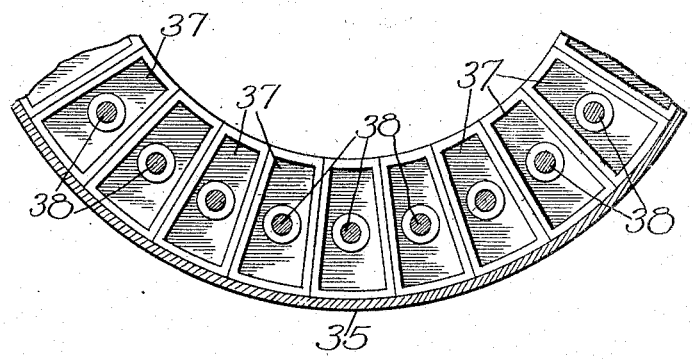
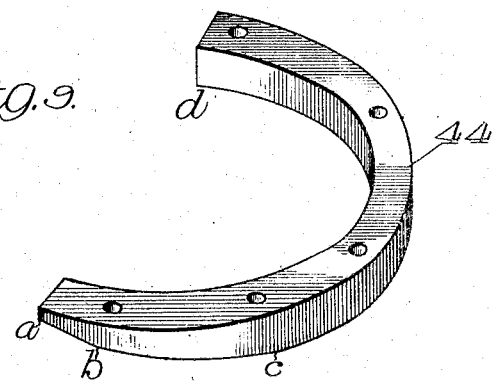
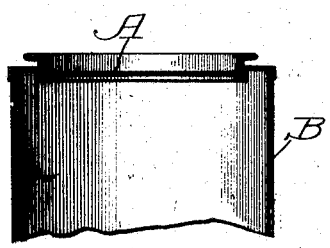
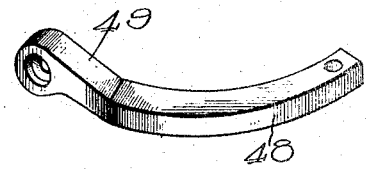

UNITED STATES PATENT OFFICE.

FREDRICK LESTER JEFFERIES, OF GRANITE CITY, ILLINOIS, AND WILLIAM SPAIN, OF ST. LOUIS, MISSOURI, ASSIGNORS TO CORN PRODUCTS REFINING COMPANY, A CORPORATION OF NEW JERSEY.

CAPPING-MACHINE FOR CANS.

1,015,320.  Specification of Letters Patent.  Patented Jan. 23, 1912.

Application filed February 18, 1911. Serial No. 609,298.

*To all whom it may concern:*

Be it known that we, FREDRICK L. JEFFERIES and WILLIAM SPAIN, citizens of the United States, residing at Granite City, in the county of Madison and State of Illinois, and St. Louis, Missouri, respectively, have invented certain new and useful Improvements in Capping-Machines for Cans, of which the following is a specification.

Our invention relates to a capping machine for cans, and the invention has for its object to provide apparatus of novel and improved construction for automatically forcing into closed position the caps or covers of so-called friction top cans.

The invention has for one of its primary objects to provide a machine which operates continuously upon a succession of the cans instead of intermittently upon separate lots or batches in accordance with the ordinary practice.

A further object of the invention is to provide a machine which feeds the cans into position to be capped, caps the same, and discharges them from the machine by a succession of operations which are automatic.

A further object of the invention is to provide an arrangement by which the movements of the capping mechanism are gradual, and continuous movements instead of the relatively quick, intermittent, reciprocating movements employed in the capping machines now in common use; this novel organization of the parts of the apparatus resulting in a machine which works more smoothly, is more durable, requires less power, and which is less likely to crush or otherwise injure the cans than the machines which have been heretofore devised to do this work.

The invention has for further objects to provide certain other novel constructions, arrangements and devices in can capping machines which will be hereinafter specifically described and claimed.

The invention is illustrated, in a preferred embodiment, in the accompanying drawings, wherein—

Figure 1 is a front elevation of the machine, certain parts being omitted for the sake of clearness of illustration; Fig. 2, a sectional elevation taken on line 2—2 of Fig. 1, looking in the direction of the arrows; Fig. 3, a sectional plan taken on line 3—3 of Fig. 1; Fig. 4, a fragmentary sectional view taken on line 4—4 of Fig. 3, looking in the direction of the arrows; Fig. 5, a sectional plan taken on line 5—5 of Fig. 2; Fig. 6, an elevation of the lifting cam; Fig. 7, a sectional view taken on line 7—7 of Fig. 5, looking in the direction of the arrows; Fig. 8, a sectional plan on line 8—8 of Fig. 2; Fig. 9, a view, in perspective, of the pressing cam; Fig. 10, a detail, in perspective, of a device adapted to supplement the action of the elevating cam, and Fig. 11, a fragmentary sectional view illustrating the character of the cans operated upon.

Like characters of reference indicate like parts in the several figures of the drawings.

Referring to the drawings, the numerals 20 designate four uprights which support a base plate 21 and, at their upper ends, a cam supporting plate 22. Plates 21 and 22 are preferably formed with bearings 23, 24 for the main shaft 25 of the machine. Any desired form of driving means may be employed for driving this shaft. We have shown a worm wheel 26 keyed to the upper end of the shaft and meshed by a worm shaft 27 mounted in bearings 28 on the top of plate 22 and carrying the fast and loose pulleys 29, 30 for a driving belt.

Keyed to shaft 25, and preferably secured thereon also by set screw 31, is a circular table 32 having a hub portion 33 extending into a boss 34 on the base plate 21. Above table 32 is a similar plate 35 keyed to shaft 25 and secured thereto by the set screw 36. Table 32 serves as a support for the cans while they are being capped. Plate 35 guides the pressing devices or plungers which perform the capping operations. These capping or pressing devices consist of plungers 37 carried on rods 38 extending through a boss 39 on the upper surface of plate 35, the rods 38 being provided at their upper ends with forks 40 having preferably a threaded engagement therewith for adjustment, said forks 40 carrying the anti-friction rollers 41 and, mounted on studs 42, the anti-friction rollers 43. The pressing or capping devices are in circular arrangement. Preferably the plungers are given a form substantially like that shown in Fig. 8, and are arranged so that they work one against the other. In the figures, except Fig. 8, only two of the pressing devices are shown, this being for the purpose of clearness of illustration.

On the under side of plate 22 is the pressing cam 44, a detail of which is shown in Fig. 9. Referring to this figure, the pressing cam is preferably formed with a relatively sharp inclination at its front end, that is, from *a* to *b*. Then follows a more gradually inclined section from *b* to *c*, after which the part in question is not properly a cam being of the same thickness, that is to say, from *c* around to *d*. The cam 44 is encountered at the point *a* by the rollers 41 on the plungers, the cam being so positioned that this engagement takes place very soon after the cans have been fed upon table 32. As a result of this engagement the plungers are brought down gradually upon the covers A of the cans B, this taking place, relative to the cam 44, between *b* and *c*. After that the plungers are kept closely pressed against the covers A, that is, between the points *c* and *d* on cam 44. As the roller 41 of any given plunger rides out from under cam 44, roller 43 starts to ride over a lifting cam 45, the preferred construction of this cam being shown in detail in Fig. 6. As shown, it consists of a curved angle strip secured to the under side of the plate 22 and formed with a ledge 46 which is inclined from *e* to *f* and is horizontal from *f* to *g*. The lifting cam 45 positively raises the plungers successively after they have performed the operation of forcing the tops into the openings in the cans. In order to avoid the obvious difficulties which would result from the depressing and raising of the plungers solely by means of the two rigidly mounted cams above described, we preferably provide an elastically mounted support for the plungers during the portion of their cycle in which they are being depressed against the cans, that is, the portion of the cycle represented on cam 44 by the distance *a*, *c*. Lifting cam 45 is formed with a lug 47 to which is pivoted the curved strip or supporting member 48, the upper surface of which at the pivoted end is preferably formed with a somewhat sharp inclination 49. The other end of the supporting member 48 rests upon a coiled spring 50 carried on a bracket 51 bolted to plate 22. Preferably the supporting member has a guide rod in the form of a bolt 52 which passes through an opening in bracket 51 and is provided with a set and adjusting nut 53. Supporting member 48 is arranged in alinement with the ledge 46 so that in leaving the ledge roller 43, of any given plunger, moves upon this flexibly mounted support. The plunger is therefore kept from dropping down on the can below it, which might injure the can and, in any event, would be likely to displace the cover, but it is yieldingly held so that the intended gradual depression of the plunger under the action of the cam 44 may properly take place.

The cans may be fed onto the table 32 in any suitable manner. We have shown, and prefer to employ, an endless chain conveyer 54 running over sprockets 55 on a shaft 56 which carries a sprocket 57 connected by a chain 58 with a sprocket 59 on the shaft 27. In order to properly position the cans on the table they are passed along a short guide 60 on one side of the conveyer and a longer guide 61 which extends for a considerable distance over the table from the other side of the conveyer and is curved or bent in the direction of rotation of the table.

Any suitable means may be employed for removing the capped cans from the table 32, or, of course, this operation, and the feeding operation for that matter, may be performed by hand. Preferably, however, we use a discharging device which, besides removing the cans from the table, turns them over into horizontal position so that they may be conveyed to any desired point in the factory by the ordinary can run. An inclined chute 62 is provided which leads from the table at the proper discharge point, and extending from the chute above the table is a curved arm 63. At the point where the cans leave the table an inclined member 64 is arranged which receives the cans and tilts them over into the chute.

The operation of the machine above described is as follows: The cans B are delivered upon table 32 by a chain conveyer 54. Before reaching the machine the caps A are placed over the openings which they are designed to cover. The guides 60, 61 properly position the cans under plungers 37. This takes place while the plunger or plungers directly above the can in question are in the raised position shown at the right hand side of Fig. 2. Following the course of any one can, after the table has been rotated so as to carry the can a short distance from the conveyer, the plunger above the can, which has been held up by the engagement of roller 43 with lifting cam 45, is depressed by engagement of roller 41 with the pressing cam 44. Roller 43 by this time has passed beyond the lifting cam and is upon the yieldingly mounted supporting member 48. The plunger is pressed down very gradually against the can cover, forcing the latter slowly into the mouth of the can. The plunger is brought into contact with the can cover between the points *a*, *b* on the pressing cam. The forcing of the cap into the mouth of the can takes place between *b* and *c*. After this, that is while roller 43 moves from *c* to *d*, the cover is held firmly pressed in its closing position. This position of the parts is shown at the left hand side of Fig. 2. It is desirable to keep the plungers in contact with the can covers for some little time after the latter have been pressed home so as to prevent the tendency which the covers might have to spring out were they released as soon as forced into the closing position. As roller 41 leaves the pressing cam 44 roller 43 rides up the lifting cam 45. The action here is positive so that the can is always freed by the time it reaches the delivery point. At this point the can meets the arm 63 and is forced off the table onto the inclined surface 64 which topples it over into the chute or run 62.

The operation has been described as though each of the cans was operated upon by a single plunger and by that alone. It is one of the desirable features of our machine that this does not have to be necessarily the case. Preferably, in fact, the plungers are somewhat narrower than the cans and in any event, no effort is made to center the separate cans under separate plungers. The plungers work so close together and so gradually that if there is an overlapping no harm is done. Any one plunger is but a trifle above or below its neighbor so that the position of the cans with respect to the plungers is of no particular importance.

The machine operates upon the cans continuously and not intermittently. Therefore it requires less power to operate it than is required by the ordinary intermittent reciprocating type of can capper. Furthermore, the feed to and from the machine can be uninterrupted. The slow and continuous movement of the plungers is well calculated to perform the desired operation as a machine so organized is less apt to crush and bend the cans and is more sure of bringing about a proper capping operation than machines which operate by relatively quick reciprocating movements on a large number of cans at the same time.

While we have described our invention in its preferred embodiment, it will be obvious to those familiar with machinery of this general sort that some modification in the form, construction and arrangement of the elements constituting a machine may be made without departure from the invention. Therefore we do not limit ourselves to the particular constructions, arrangements and devices shown and described except so far as such particular constructions, arrangements and devices are made expressly limitations on certain of the claims herein.

We claim:

1. In apparatus of the character described, the combination with a rotary table, of a series of plungers arranged above the table and so as to rotate therewith, a stationary cam support, a depressing cam on the under side of said support, a lifting cam on said support provided with a laterally projecting flange adapted to be engaged by said plungers, and a yielding support for said plungers at one end of said lifting cam.

2. In apparatus of the character described, the combination with a rotary table, of a series of plungers arranged above the table and so as to rotate therewith, a pressing cam with which said plungers are engaged and which depresses them, a lifting cam which raises the plungers out of contact with the cans, and a yielding support for said plungers during a portion of the period in which they are in contact with the pressing cam.

3. In apparatus of the character described, the combination with a rotary table, of a series of plungers arranged above the table and so as to rotate therewith, a pressing cam with which said plungers are engaged and which depresses them, a lifting cam which raises the plungers out of contact with the cans, and a supporting device for the plungers which is pivoted to one end of the lifting cam and yieldingly supported at the other end.

4. In apparatus of the character described, the combination with a series of plungers, of means for supporting the cams in alinement with said plungers, means for raising said plungers, means for depressing the same, and a yielding support for the plungers during a portion of the depressing operation.

5. In apparatus of the character described, the combination with a support for the cams, of a series of plungers arranged one close to the other so that more than one plunger may operate upon a can, and means for successively depressing and raising said plungers.

6. In apparatus of the character described, the combination with a support for the cans, of a series of plungers arranged one close to the other so that more than one plunger may operate upon a can, means for successively depressing and raising said plungers, and means for automatically feeding said cans upon said support.

7. In apparatus of the character described, the combination with a support for the cans, of a series of plungers in circular arrangement and formed with flat faces in engagement with each other, means for successively depressing said plungers, and means for raising them out of contact with the cans.

8. In apparatus of the character described, the combination with a supporting framework, of a central shaft, means for driving said shaft, a table secured to the shaft, a plurality of plungers in circular arrangement and supported above the table so as to rotate therewith, a pair of rollers carried on the upper end of each of said plungers, a pressing cam with which one of said rollers is adapted to engage, a lifting cam with which the other of said rollers is adapted to engage, a support for said last mentioned roller pivoted to the end of the lifting cam, and a spring against which the other end of said supporting member bears.

9. In apparatus of the character described, the combination with a series of plungers, of means for supporting the cans in alinement with said plungers, a depressing cam for the plungers, a raising cam for the same, and a yielding support for the plungers arranged at one end of said raising cam.

10. In apparatus of the character described, the combination with a support for the cans, of a series of plungers arranged so that they work one against the other, and means for successively depressing and raising said plungers.

11. In apparatus of the character described, the combination with a support for the cans, of a series of plungers in circular arrangement and which work one close to the other so that more than one plunger may operate upon a can, means for successively depressing said plungers, and means for raising the same out of contact with the cans.

12. In apparatus of the character described, the combination with a support for the cans, of a series of plungers in circular arrangement and which work one close to the other so that more than one plunger may operate upon a can, means for successively depressing said plungers, means for raising the same out of contact with the cans, and means for yieldingly supporting the plungers during a portion of the depressing operation.

13. In apparatus of the character described, the combination with a rotary table adapted to support the cans, of a plurality of plungers which are arranged above the table, one close to the other so that more than one plunger may operate upon a can, means for positively depressing and positively raising said plungers successively, and means for yieldingly supporting said plungers during a portion of the depressing operation.

FREDRICK LESTER JEFFERIES.
WILLIAM SPAIN.

Witnesses:
F. M. SAYRE,
A. H. KELLING.